US011366912B2

(12) United States Patent
Serdar et al.

(10) Patent No.: US 11,366,912 B2
(45) Date of Patent: Jun. 21, 2022

(54) CONTEXT-AWARE CONSENT MANAGEMENT

(71) Applicant: CLOUD PRIVACY LABS, LLC, Greenwood Village, CO (US)

(72) Inventors: Berrin Serdar, Englewood, CO (US); Burak Serdar, Englewood, CO (US)

(73) Assignee: Cloud Privacy Labs, LLC, Greenwood Village, CO (US)

( * ) Notice: Subject to any disclaimer, the term of this patent is extended or adjusted under 35 U.S.C. 154(b) by 0 days.

(21) Appl. No.: 16/866,338

(22) Filed: May 4, 2020

(65) Prior Publication Data

US 2021/0303705 A1    Sep. 30, 2021

Related U.S. Application Data

(60) Provisional application No. 62/842,362, filed on May 2, 2019.

(51) Int. Cl.
*G06F 21/60* (2013.01)
*G06F 21/62* (2013.01)

(52) U.S. Cl.
CPC ........ *G06F 21/604* (2013.01); *G06F 21/6245* (2013.01)

(58) Field of Classification Search
CPC .... G06F 21/604; G06F 21/6245; G06F 21/10; G06F 21/556; G06F 21/62; G06Q 30/06; G06Q 10/10; H04L 63/0428; H04L 67/1097; H04L 63/102
USPC ............................................................ 726/1
See application file for complete search history.

(56) References Cited

U.S. PATENT DOCUMENTS

| 7,912,971 | B1* | 3/2011 | Dunn | H04L 63/102 |
| | | | | 726/28 |
| 2005/0060353 | A1* | 3/2005 | Tan | G06F 16/9535 |
| 2011/0119732 | A1* | 5/2011 | Dunn | H04L 63/102 |
| | | | | 726/1 |
| 2013/0111545 | A1* | 5/2013 | Sharma | H04L 63/10 |
| | | | | 726/1 |
| 2015/0254456 | A1* | 9/2015 | Jacquin | G06F 21/6245 |
| | | | | 726/1 |

(Continued)

OTHER PUBLICATIONS

International Search Report and Written Opinion of International Application No. PCT/US2020/031377 dated Oct. 13, 2020, 14 pp.

*Primary Examiner* — Sanchit K Sarker
(74) *Attorney, Agent, or Firm* — Davis Graham & Stubbs LLP

(57) ABSTRACT

A consent and privacy preferences management environment (300) includes an application (302) and a Consent Management System (CMS) (304). The CMS (304) stores and processes consent information (306) of an end user (308). The application (302) obtains the consent information and uses the CMS (304) to manage choices of the end users (308) about certain activities, events, or other situations. Third parties (310) use the application (302) to submit requests for consent. The application (302) maps the request into fields of an API (314) for processing by the CMS (304) and receives a response from the CMS (304). The application then provides or denies consent regarding the end user (308) based on the response and filters or masks data based on organizational policies, end user consent, and the context. The data structure of the CMS (304) adapts to a wide variety of consent application environments.

15 Claims, 3 Drawing Sheets

(56) References Cited

U.S. PATENT DOCUMENTS

| | | | |
|---|---|---|---|
| 2016/0070758 A1* | 3/2016 | Thomson | G16H 10/60 707/781 |
| 2016/0112208 A1* | 4/2016 | Williams | H04L 9/3268 713/176 |
| 2018/0004932 A1* | 1/2018 | Gray | H04L 63/0421 |
| 2020/0106750 A1* | 4/2020 | Baker | G06F 21/6263 |

* cited by examiner

Screen 1 (100) — Which Vendor's May Access Your Data?
- ● Vendor 1
- ○ Vendor 2
- ○ Vendor 3

Screen 2 (102) — For What Purpose May Vendor 1 Use Your Data?
- ● Order Confirmation
- ● Marketing
- ○ Credit Check
- ○ Sell Data

Screen 3 (104) — What Data May Vendor 1 Use For Order Confirmation?
- ● Age
- ○ Gender
- ○ Occupation
- ○ Interests
- ● Income

Screen 4 (106) — What Data May Vendor 1 Use For Marketing?
- ● Age
- ● Gender
- ○ Occupation
- ○ Interests
- ○ Income

FIG. 1

CONTEXT-AWARE CONSENT MANAGEMENT

REFERENCE TO RELATED APPLICATIONS

This application is a non-provisional of U.S. Patent Application No. 62/842,362 entitled, "CONTEXT-AWARE CONSENT MANAGEMENT AND DATA FILTERING SYSTEM," filed May 2, 2019 (the "Parent Application") and claims priority from the Parent Application to the maximum extent permissible under applicable laws and regulations. The Parent Application is incorporated by reference herein in its entirety.

FIELD OF THE INVENTION

The present invention relates to managing consent and privacy preferences relating to an activity, event or other situation where consent is sought from a party such as an individual or entity. Such consent may involve accessing data or filtering data, e.g., concerning access to and use of private and/or personal data. In particular, the present invention relates to a method and apparatus for configuring and operating a consent management system.

BACKGROUND OF THE INVENTION

There are many contexts in which consent and privacy preferences from one or more parties is required or desired. For example, such consent may be obtained before accessing or using private data (data that is owned or controlled by a controlling entity), allowing a company or other party to contact an individual, participating in a study or trial, or engaging in or abstaining from various activities. In some cases, consent may be required from multiple parties. For example, to gain access to an individual's personal data stored in a third-party database, a requester may require consent from the database operator to access the database and consent from the individual to access particular data. In all of these cases, it is useful to employ a consent management system to ensure that the consent from the relevant parties is efficiently and properly obtained.

Many companies have developed consent management systems to address specific needs. For example, some companies will allow customers to opt-in or opt-out with respect to marketing communications. Similarly, some companies collect information from individuals regarding how their data may be used. However, the systems are often tailored to a specific environment and generally only attempt to make very coarse distinctions concerning access to or use of data. As a result, the systems are expensive and time-consuming to implement and risk over or under inclusion of data. It will be appreciated that over-inclusion may entail a privacy violation or violation of applicable policies, laws, or regulations. Under-inclusion may result in an unnecessary loss of data or participation where all relevant parties were willing.

SUMMARY OF THE INVENTION

The present invention relates to a system and associated functionality for managing consent and privacy preferences that is applicable to a variety of consent environments. The invention allows subjects or end users to specify consent information in relation to contextual information relevant to the consent environment such as who is requesting consent and for what purpose. Then, when third parties submit consent requests, consent can be efficiently managed in relation to the consent information provided by the end user. Consent can thus be implemented on a very fine basis depending on the context of the consent request in accordance with the end user's consent information. In the context of consent related to accessing data, over-inclusion or under-inclusion of data is reduced or substantially eliminated.

In accordance with one aspect of the present invention, a consent management system is provided. The consent management system includes an input module for receiving a consent and privacy preferences request and processing the request to determine a context of the request. The context of the request is determined by identifying multiple contextual fields of the request and obtaining a content associated with each of the fields. The consent management system further includes a processor for identifying an end user associated with the consent request and executing context-based rules associated with the end-user to make a determination concerning the consent request. The consent management system further includes an output module for providing an output based on the determination.

The consent request may or may not involve access to user information of the end user. In the case of a consent requests concerning access to user information of the end-user, the context-based rules may govern access to specific items of user information based on the context of the request including who is requesting the information and for what purpose. In this regard, consent may be granted or denied with respect to specific items of the user information so that filtering of the user information is executed in relation to the specific context of the request and the specific items of information involved. In this manner, over-inclusion or under-inclusion of user data is minimized. The consent management system can be based on generic data objects and operations that are abstracted from a particular consent environment. These generic data objects and operators can then be adapted to a specific consent application and environment such that the consent management system can support a variety of different consent applications in different consent environments.

Associated functionality involves receiving a consent request concerning a "SmartConsent" that is potentially subject to consent information. The SmartConsent concerns an activity, event, or other situation involving consent by an end user and combines contextual information and business logic to evaluate if a request is granted by the consent or in the current context of the request. Such consent may or may not relate to accessing information of the end-user. For example, such consent may relate to participating in a clinical study, marketing activity, or research project without providing access to user information. The functionality further involves processing the consent request to determine a context of the request and to identify multiple contextual fields of the consent request. An identity of the end-user implicated by the consent requests is determined and context-based rules of the end-user are obtained. The content of the contextual fields and context-based rules can then be used to access consent information and make a determination regarding consent for the SmartConsent. A response to the consent request is then provided based on the determination.

In accordance with another aspect of the present invention, an application is provided for storing consent information in conjunction with a consent management system. The application involves structure and corresponding functionality for use in managing consent for an end user. An application programming interface and user interfaces are provided to obtain consent information for the end-user. The interface includes a number of prompt elements for entering the consent information, for example, concerning who may obtain consent from the end-user and under what conditions, where the prompts are specific to an environment of the consent management application. The application works in conjunction with a consent management system for managing consent based on rules that operate on multiple fields of data each associated with corresponding values. The consent management system includes configuration elements involving at least one field that is definable to adapt the consent management platform for a specific consent management environment. The application further involves mapping fields of the prompt elements of the application interface to the configuration elements of the consent management system, receiving inputs from an end-user entered via the prompt elements of the interface, and using the inputs to configure the consent management system to control consent for the end-user in accordance with the consent information.

In accordance with a still further aspect of the present invention, an application is provided for executing consent information in conjunction with a consent management system. As described above, the consent management system is operative for managing consent based on rules that operate on multiple fields of contextual information each associated with corresponding values. The application involves receiving a consent request from a third-party and mapping elements of the consent request and associated context to the multiple fields of contextual information of the consent management system. After the consent management system evaluates the consent request, the application receives a response to the consent request and selectively grants or denies consent based on the response.

In accordance with a still further aspect of the present invention, a client device and associated functionality is provided for accessing a consent management system. The client device may be, for example, a device of an end user or a third-party requesting consent of the end user. In any event, the client device is operative to submit to the consent management system context specific consent information. Such context specific consent information may define consent rules or request consent dependent on context, e.g., the purpose of the consent request. For example, the context specific consent information may be submitted to the consent management system via an application. In this manner, consent can be managed in relation to a context of a consent request.

In accordance with a still further aspect of the present innovation, an application is provided for processing data in conjunction with a data management system. The data management system provides mechanisms (e.g. application program interfaces, user interfaces) to receive structured (e.g. JSON, XML) or unstructured (e.g textual) data from a data controller, to apply annotations to data by attaching labels to classify certain parts of the data according to a controller chosen taxonomy and, filtering/masking/modifying selected parts of the data based on active consent information and privacy policies of the controller. For example, the consent management system can be used to remove identifying information from data when the controller is exchanging information with a third party if the consenter did not agree to share identifying information for the given context. As a further example, location information or address information may be generalized (e.g., to a zip code or by limiting the resolution of a geocode so that it is not personally identifying), or information for multiple parties may be aggregated. Also, as described above, individual items of information may be filtered or masked while providing other items of information responsive to a request.

BRIEF DESCRIPTION OF THE DRAWINGS

For a more complete understanding of the present invention, and further advantages thereof, reference is now made to the following detailed description, taken in conjunction with the drawings, in which:

FIG. 1 shows user interface screens of an application used to enter consent information in accordance with the present invention;

DESCRIPTION OF THE INVENTION

Figure 2:
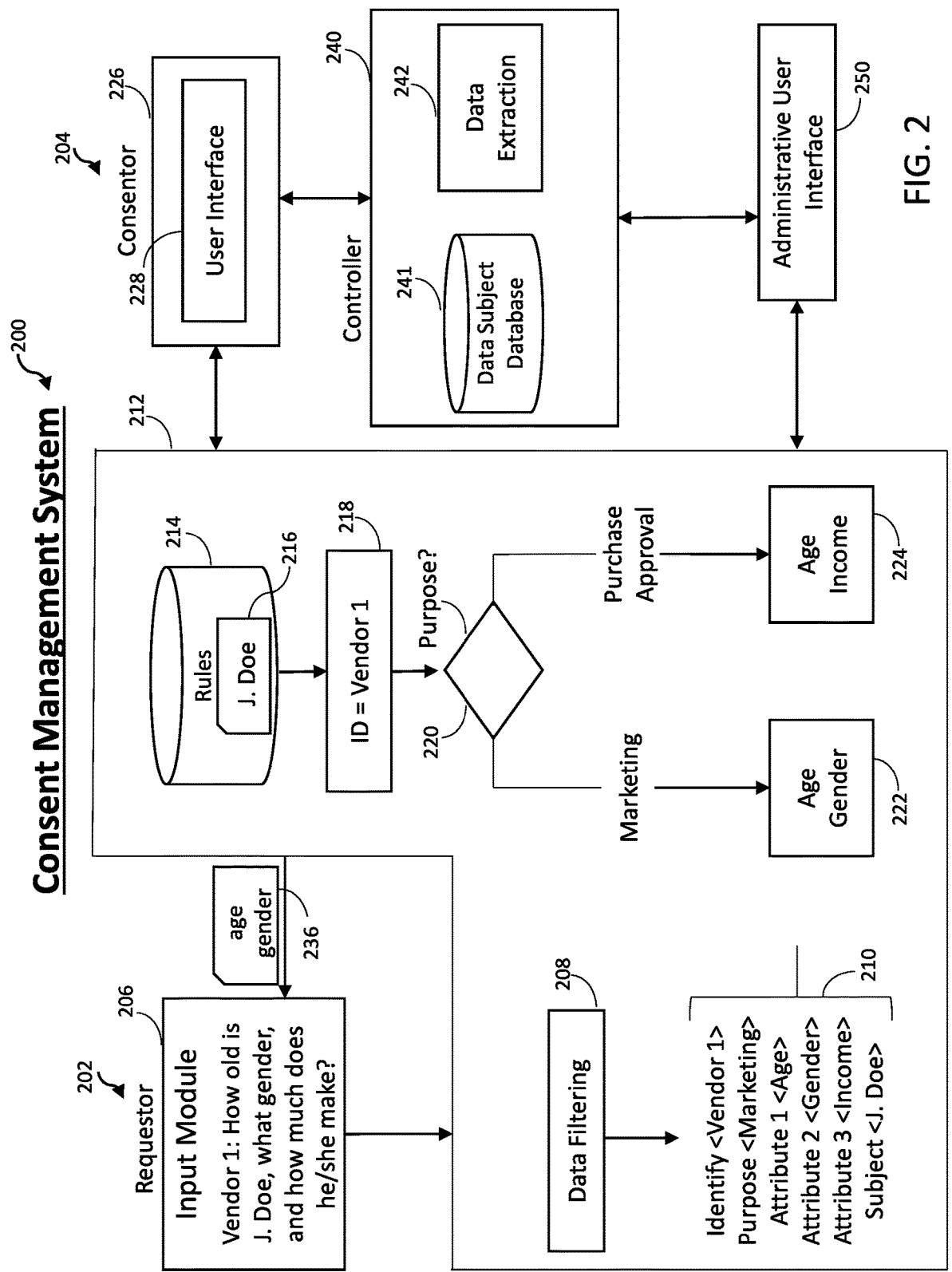
FIG. 2 illustrates a consent management system in accordance with the present invention.

The present invention relates to a consent and privacy preferences management system and processes for developing and implementing the consent and privacy preferences management system. The inventive consent management system is context-aware such that consent decisions may be based on contextual elements such as who is requesting consent, to what, and for what purpose and may take into account any other contextual information such as location of the requestor or consenter, information relevant to policies and others. In this manner, fine distinctions can be made in real time to enable more full consent with fewer mistakes. Moreover, the invention includes generic elements that can be dynamically configured for a particular consent environment. Accordingly, the consent management system is readily adapted to a broad range of consent environments, thereby reducing costs and effort associated with deploying the system.

As will be understood from the description below, the invention includes a consent management system that can be accessed by a party ("controller") who owns or controls access to private data of another party ("consenter" or "end user") having the right to grant or withhold consent and by a party ("requester" or "third party") seeking consent with regard to a SmartConsent ("requester" or "third party"). "SmartConsent" combines the contextual information and the business logic to evaluate if a request to access data or perform an activity is granted by the consenter in the current context of the request, and the business logic to determine the data scope to which the consent applies.

It will be appreciated that access to information may be based on rules of both the end user and another party such as the controller. Moreover, rules may be based on laws, regulations or other privacy considerations. For example, access may require that the end user has consented to access, that all relevant laws and regulation have been satisfied, and that other organizational privacy policies and open-ended privacy concerns have been addressed. Thus, the consent management system may apply consent rules originating from an end user, legal considerations, and rules originating from another party. In such cases, multiple parties (e.g., the end user and an organization having privacy policies) may function as controllers and define rules to control access to the requested information.

The consent management system is machine-based and may be implemented on a cloud-based platform or on one or more servers or other machines at a single or multiple locations. The system may also include software or other logic resident on a computer, tablet, phone or other device of a user, e.g., a consenter or requester. The user device may access the consent management system using an application that is specific to the consent management environment.

The controller may access the consent management system to enter SmartConsent metadata using an administrative user interface. The SmartConsent metadata contains the schema that describes the context and the logic to evaluate if a given context matches consenter choices and, if the consented activity involves revealing or sharing personal data, the categories of data controlled by the SmartConsent based on the context.

A consenter may access the consent management system to enter consent information. The consent information may be entered using a series of user interface screens or other input prompts. Such user interface screens may be generic, adapted to a specific consent environment, or can be dynamically generated using metadata stored in the consent management system.

FIG. 1 illustrates a number of user interface screens that may be used to enter consent information for a particular consent environment, e.g., relating to selectively granting access to private data. In the illustrated implementation, such consent information is entered with respect to providing access to private data by certain specified vendors who may use the data for various purposes. FIG. 1 shows a first user interface screen 100 where the consenter is prompted to indicate which of various specified vendors may have access to private data of the consenter. For example, these vendors may be derived from a list of vendors who have an existing business relationship with the consenter or may be vendors who purchase data from a database administrator. In the illustrated case, the consenter has indicated that Vendor 1 will have consent to access data. As will be understood from the description below, the consenter will have the opportunity to define the scope of access in subsequent user interface screens. Accordingly, the consenter may select all vendors in screen 1 who will have any access rights.

Based on the consenter inputs on the first screen 100, the logic of the consent management system may present any of various screens. That is, the consent management system may execute branching logic that is dependent on the information entered on each user interface screen. In the illustrated example, the consenter is next presented with a second user interface screen 102. On this screen 102, the consenter is prompted to identify the purposes for which Vendor 1 may access or use the data. In this case, the options include using the data for order confirmation, marketing, credit check, or selling data, e.g., to other vendors. In the illustrated example, the consenter has indicated that the data may be used for order confirmation and marketing.

It is anticipated that the consenter may consent to the use of different scopes of data for different purposes. Accordingly, successive user interface screens may be employed to elicit the scope of data that may be used for each indicated purpose. FIG. 1 shows a third screen 104 that may be presented concerning the scope of data that may be used for the purposes of order confirmation. In this case, the consenter has consented to the use of age and income information for purposes of order confirmation. The fourth screen 106 shows a user interface by which the consenter can indicate the scope of data that will be available for marketing purposes. In this case, the consenter has consented to use of age and gender information.

These user interface screens can be used to create structured data for use by the consent management system. In particular, the prompts or input elements of the user interface screens can be mapped to elements of a schema for the data. Thus, for example, when the consenter selects Vendor 1 on the first screen 100, that consent information may be mapped to a schema element having a content of "Vendor 1" associated with metadata such as tags indicating the field of "requester."

It will be appreciated that FIG. 1 shows one exemplary context of the present invention and the invention is not limited to use in this environment but is more generally applicable to a broad range of SmartConsents. In particular, the invention is not limited to providing access to private information but may involve other types of activities such as consent to participate in a study or trial or consent to participate in or abstain from a variety of other activities, as will be described in more detail below.

FIG. 2 illustrates a consent management system 200 in accordance with the present invention. The system 200 includes a processing platform 212 that can be accessed by a consenter (directly or via an application as described below) to input consent information, and by a requester 202 to enter a request related to an activity. In one implementation, the platform 212 is cloud-based and may be distributed over multiple machines at multiple locations. As described above, the consenter 204 can use a user interface 228 of a user device 226 to access the consent management system 200. It is assumed that the controller 240 has personal information in its data subject database 241. The controller 240 can also access the platform 212 to enter schema for the data as described above. The data extraction module 242 can access personal information from the database 241 as required.

The requester 202 employs an input module 206 to enter a request related to a SmartConsent. For example, the input module 206 may include software, one or more application programming interfaces, or other logic accessed via a computer, tablet, or phone. In the illustrated embodiment, the requester 202 is the vendor designated Vendor 1. The requester 202 may enter a request in free-form text or via a series of predefined user interface screens. For example, such screens may require the requester to indicate who is the subject of the request, what data is desired, and what is the purpose of the request. The identity of the requester may be explicitly entered or may be known from a login process or by identifying the device used by the requester 202. In this case, the vendor requests age, gender, and income information regarding the subject "J. Doe." It will be appreciated that J. Doe may be the consenter 204 or the consenter 204 may be another party, for example, to whom J. Doe has delegated consent rights.

In order to facilitate the application of rules by the consent management system 200, the request is processed by a rule-based data filtering module 208. For example, the controller may extract the requested data from its subject database 241 and send it to the data filtering module 208 to correlate and redact sections based on organizational policies and SmartConsent information stored in the rules repository 214. In the case where the request is entered via a series of input screens, those screens may be designed so that the request information maps directly to the desired data structure e.g., data entered in a box prompting the user to designate allowed purposes for which the data may be used can be associated with metadata defining the field "purpose" and the data entered may define values for that field. If the request is entered in a different format, such as a free-form text request, logic may be employed to parse the request into elements that can be mapped to appropriate fields and content of the desired data structure. In the illustrated embodiment, the data filtering module 208 outputs structured data 210. The structured data 210 includes the fields identity, purpose, attribute 1, attribute 2, attribute 3, and subject that have the respective contents of Vendor 1, marketing, age, gender, income, and J. Doe.

The platform 212 includes a repository of organizational policies and SmartConsent rules 214. These rules may include rule sets that are indexed to each of the consenters for whom consent is managed, and rules encoding organizational policies that are not tied to specific consenters or specific SmartConsents. It will be appreciated that these rules may entail complex branching logic composed of multiple Boolean elements related in a defined series. FIG. 2 illustrates an execution of rules for the subject J. Doe 216.

As discussed above, the consent rules may define different consent information for different requesters. In this case, the platform 212 uses the identity of Vendor 1 from the structured data 210 to access rules defined by the subject 216 for the requester 218. These rules require a decision 220 depending on the specified purpose of the SmartConsent. As described in connection with FIG. 1, the two purposes for which the subject 216 has granted consent to the requester 218 are the purposes of marketing and purchase approval. For marketing purposes, the subject has consented to accessing or using information 222 concerning age and gender. For purposes of purchase approval, the subject 216 has provided the requester 218 consent to access information 224 concerning age and income. In this case, where the structured data 210 indicates the purpose of marketing, the platform 212 provides an output 236 including age and gender information to the requester 202.

Figure 3:
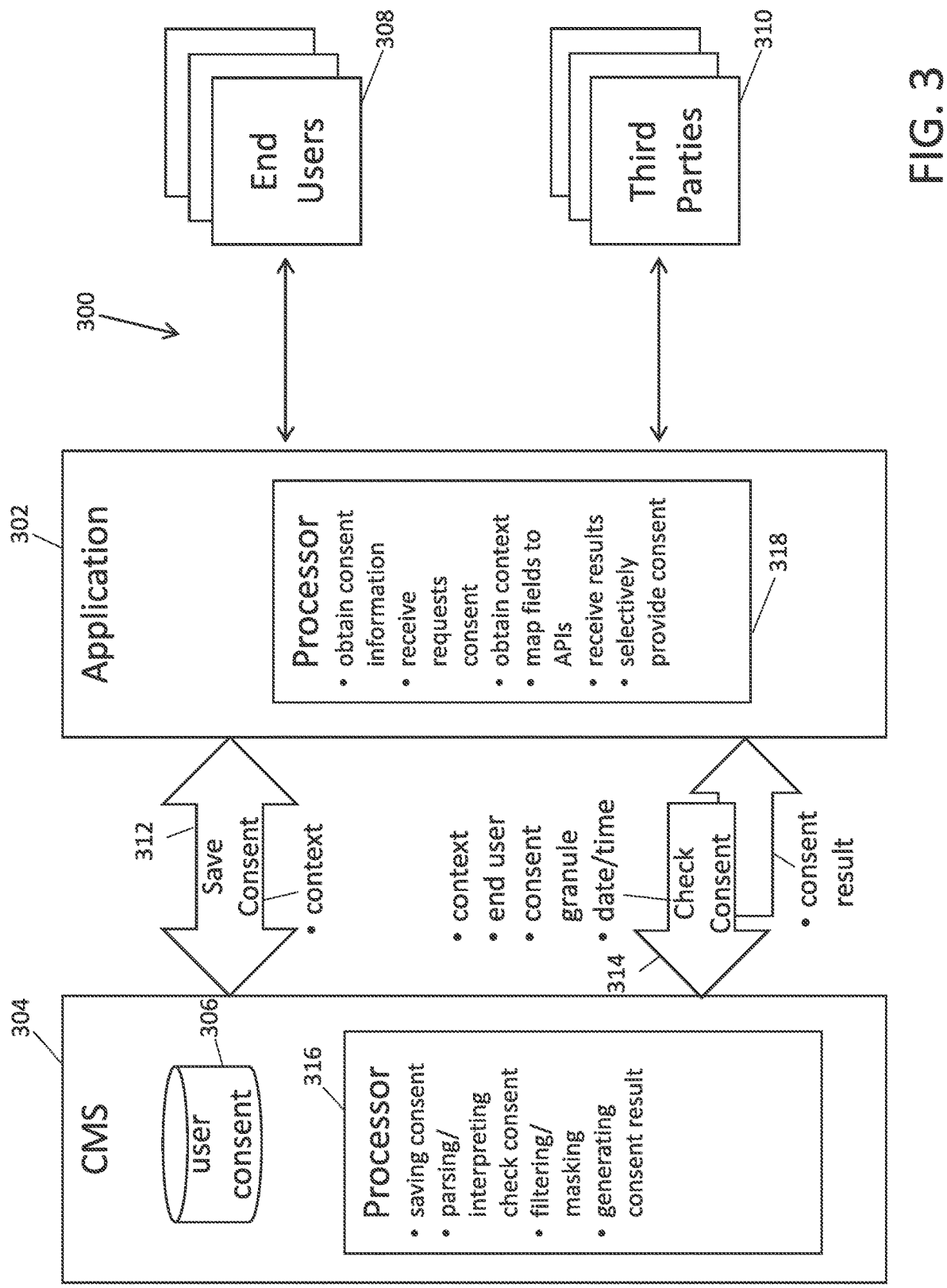
FIG. 3 shows an overall data environment of the present invention.

FIG. 3 shows an overall data environment 300 of the invention. Generally, the environment 300 includes an application 302 and a Consent Management System (CMS) 304. As will be described in more detail below, the CMS 304 is a platform running logic (software, hardware and/or firmware) that stores and processes end-user consent information 306. The platform may include a single machine (e.g., server) or multiple machines that can be geographically distributed. The application 302 is a platform running logic (software, hardware, and/or firmware) that uses the CMS 304 to manage choices of its end-users 308 about certain activities, events, or other situations. Again, the platform may be embodied in a single or multiple machines and may be geographically distributed. The end-users 308 can be any person, people, and/or entities whose consent is sought or required for an activity, event, or other situation.

The CMS 304 can support many different types of applications where consent of end-users is sought or required. Examples include e-commerce applications, a healthcare or lifestyle application, or any other application that stores and processes end-user data and involves end-user consent. While many such applications involve managing end-user consent in relation to providing access to end-user data, consent may be required in other contexts. For example, a marketer or political candidate or organization made desire consent to contact specific end-users, including end-users for whom such third parties already have contact information. If the end-user has so agreed, the third party may obtain consent to contact the end-user for the specified purpose. In such cases, the application may simply provide consent without providing access to any information of the end-user. It will thus be appreciated that the invention is not limited to managing access to user information but is more broadly applicable to substantially any context in which consent is required from an end-user. Although only a single application 302 is depicted in FIG. 3 for purposes of illustration, it will be appreciated that the CMS 304 may support many applications that operate in different consent environments.

Similarly, it will be appreciated that a variety of different parties may seek consent depending, for example, on the nature of the application 302 and the overall environment 300. These may be individuals, groups of people, and/or organizations (companies or other entities). For convenience, these parties are referenced as third parties 310 in FIG. 3. Examples of such third parties include e-commerce platforms, marketers, researchers, medical service providers, political candidates and organizations, targeted advertising platforms, social networks, realtors, licensing agents, and other creditors, and others.

As noted above consent of an end user may be sought or required in a variety of different situations and may or may not seek access to data. Accordingly, SmartConsents can be used in relation to any activity, event, or other situation for which consent is sought or required. For example, consent may be required in the following situations:
  in healthcare, consent to provide care;
  in healthcare, consent to access patient information (e.g., by a healthcare provider or insurance company);
  consent to participate in a clinical trial;
  agreement to the terms and conditions of a website;
  agreement to be contacted by an entity by email;
  agreement to receive targeted advertisements via IP and broadcast networks and/or to allow use of personal information in connection therewith;
  agreement to allow creditors, financial organizations, banks, or social networks to verify personal or financial information;
  agreement to be contacted by political candidates or organizations; and
  agreement to have personal information shared with third parties.

In such cases, consent can be understood as involving a permission, limitation, or denial of permission with respect to specific elements or subsets thereof for which consent is sought or required. This may involve some identification of the end-user or users, a context, and other specifications of the subject matter of the consent (e.g., an identification of data for which access is desired). The context describes the real-world situation and may include, for example, who is seeking consent and for what purpose. In general, third parties will seek consent from the application 302 and the application will invoke the CMS 304 to manage such requests, e.g., to analyze and respond to such requests. Accordingly, in the illustrated environment 300, structure may be provided by which the application 302 and CMS 304 can exchange data objects, e.g., for saving user consent information 306 and for transmitting, evaluating, and responding to consent requests. Such structure includes a SaveConsent API 312 and a CheckConsent API 314. The SaveConsent API 312 is used to capture end user consents. The CheckConsent API 314 is used to transmit consent requests and receive consent results.

As noted above, the CMS 304 can support a wide variety of applications. In connection with such applications, consents may be defined relative to a variety of situations and consent requests may be made by a variety of different parties relative to a variety of different contexts. To support these environments, a data structure is utilized that can accommodate a sufficient variety of data elements and processing elements, and where these elements are adaptable to meet the needs of substantially any consent environment. That is, the CMS 304 including the SaveConsent API 312 and CheckConsent API 314, can be implemented using generic data and processing objects, as well as sets of operators concerning the relationships and interactions of the objects, that can be defined for a particular application. A number of these data and processing objects and operators are described below.

A fundamental concept in the environment 300 is context. Context can be used in defining consents provided by end-users 308 (e.g., access will be provided for what subject matter, to whom, and for what purpose) and in conveying consent requests (e.g., what consent is being sought and for what purpose). Context can be conveyed between the application 302 and the CMS 304 via a file or document, for example, a JSON document describing the real-world situation. The application 302 obtains consent information from the end-users via an application interface as described above. This information is conveyed to the CMS 304 via the SaveConsent API 312 such that it can be stored in the user consent database 306. Subsequently, the application 302 can receive a consent request from a third-party 310 entered via a third-party facing application interface. The application 302 can process the request, communicate request information to the CMS 304 via the third-party facing application interface.

It will be appreciated that the third parties 310 and end users 308 may access the application 302 using various client devices such as computers, tablet computers, mobile devices and the like. The illustrated application platform 302 includes a processor 318 for executing application functionality described herein. Similarly, the CMS 304 includes a processor 316 for executing CMS functionality. Many of the functions described herein can be configured for execution on a client device, the application platform 302 or the CMS 304, or may be distributed across these elements. For example, the client devices of the end users 308 and third parties 310 may have logic for executing such functionality or such logic may be provided at the application platform 302 and/or CMS 304.

The discussion below relates to a particular implementation of the invention for consent and filtering of JSON and XML documents.

Context-Aware Consent and Data Filtering of JSON and XML Documents

A SmartConsent represents the "consenter's" (or end user's) agreement, partial agreement or disagreement to a certain activity under certain conditions. A SmartConsent contains the following information:

Choices: The data controller defines the structure of consenter's choices for the specific use-case via the application. The choices may be provided in a JSON document containing data elements that can be entered by the consenter using a UI or provided using APIs.

Context schema: The data controller specifies the format of the "context" that contains data elements describing a consent validation request as a JSON schema.

Context logic: The data controller also enters logic that compares if consenter's choices are satisfied by a given context using a scripting language such as Javascript. This script becomes part of the SmartConsent.

Data Scope logic: If the SmartConsent represents consent for data exchange, data scope logic specifies the categories of data to which the consent applies. This is represented by a script such as a Javascript program or a list of labels that determine what categories of data are included in the consent.

Operation:
Consent Entry:
    Consenter is presented with a web form, or device specific input containing choices configured for the SmartConsent.
    Consenter enters information and submits data.
    The front-end builds a choices JSON document based on the entered information.
    The front-end submits this information to the consent management system using an application programming interface.
    Consent management system stores the choices document and the context logic programs in a database or on blockchain.

Consent Validation:
    Consent requester decides the SmartConsents that will be validated for the activity
    Consent requester prepares a context JSON document containing all the information required by the combination of context schemas of the SmartConsents selected
    Consent requester submits the request to the consent management system using an API along with the identifier of the data subject for which consent will be validated
    Consent management system collects all the requested consent information for the data subject from the database
    Consent management system adds data subject information and current time information to the submitted context.
    Consent management system evaluates the context logic for each consent that compares consent choices with the context. If a SmartConsent context satisfies the choices, that SmartConsent is accepted. Otherwise it is rejected.
    The accept/reject results are returned to the requester Data Filtering:
It should be appreciated that the consent management system (CMS 304) is not limited to coarse consent or deny decisions regarding requests for access to data of the end-users. Rather, consent can be evaluated with respect to individual elements of a dataset so as to provide fine filtering of data, thereby reducing or substantially eliminating issues of over inclusion and under inclusion. Data filtering uses two stages. The first stage, the data labeling stage, parses the input document and adds labels to certain fields based on criteria defined by the data controller. In a second stage, the data filtering stage, SmartConsent scopes are matched with data labels. If the end-user 308 has a positive consent for a set of SmartConsents based on the current context, and the SmartConsent data scopes match the tags of the field, then that field is included in the output document. Otherwise, the field is removed from the output document. Such data filtering may include the following:

Data controller prepares a context JSON document describing the situation under which data will be processed or exchanged.
    Data controller retrieves data subject personal information from its own storage in JSON or XML format and sends it to consent management data filter APIs along with the context.
    Consent management system applies data labeling rules to annotate the data fields with labels.
    Consent management system validates data subject consent for all known SmartConsents using the given context.

The data scope logic for all accepted SmartConsents are used to select which labels of the submitted document are allowed by the data subject.

All data fields other than those that are allowed are removed from the document.

Example:

This hypothetical example illustrates a scenario where a data controller wishes to ask consenters if they are willing to exchange their personal data with recipients based on their location.

A SmartConsent representing the willingness of a consenter to exchange personal information for recipients outside the US may be defined as follows:

Choices:
    allowedLocations: A list of strings specifying the list of countries the consenter allows.
    allowedDataCategories: A list of strings specifying categories of data allowed to be exchanged.

Context Schema:
    recipientLocation: The country code of the recipient.

Context Logic: The context logic compares if the given context satisfies user choices:

choices.allowedLocations.includes(context.recipientLocation)

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A method for use in managing consent information, comprising:
receiving a consent request concerning a situation that is potentially subject to consent information, said consent information being specified by one or more controllers;
processing the consent request to determine a context of said consent request by identifying multiple contextual fields of said consent request and obtaining a content associated with each of said fields, wherein said multiple contextual fields relate to an identity of a requester of said consent request, an identity of said controllers and a purpose for which consent is requested;
determining an identity of said controllers implicated by said consent request;
obtaining context-based rules of said controllers for one or more items of said consent information;
using said content of said multiple contextual fields and said context-based rules to access said items of consent information and using a filter based on said items of consent information regarding consent for said situation, wherein said filter controls what kinds of information can be shared such that, for a first document including multiple information items implicated by said consent request, said filter is operative to selectively disable access to a first information item of said information items; and
outputting a response to said consent request based on said determination, said response including information of said first document with said first information item disabled.

2. The method of claim 1, wherein said multiple contextual fields include one or more fields relating to an intended purpose in relation to said situation.

3. The method of claim 1, wherein said filter is operative to either allow or disallow access to user information of an end user.

4. The method of claim 1, wherein said consent request seeks to access or use first and second items of user information and said determination comprises allowing access to said first item of user information and disallowing access to said second item of user information.

5. The method of claim 1, wherein said purpose relates to a set of purposes defined by said controllers.

6. The method of claim 1, wherein said purpose is defined in relation to an input field of a user interface of a consent management program.

7. A system for use in managing consent information, comprising:
a processor and memory including instructions which, when executed by said processor, are operative for:
receiving a consent request concerning a situation that is potentially subject to consent information and processing the consent request to determine a context of said consent request by identifying multiple contextual fields of said consent request and obtaining a content associated with each of said fields, wherein said multiple contextual fields relate to an identity of a requester of the consent request, an identity of said controllers, and a purpose for which consent is requested;
determining one or more controllers implicated by said consent request and obtaining context-based rules of said controllers for one or more items of said consent information, wherein said context-based rules determine consent based on a context of the consent request, and using said content of said multiple contextual fields and said context-based rules to access said items of information and using a filter based on said items of consent information regarding consent for said situation, wherein said filter controls what kinds of information can be shared such that, for a first document including multiple information items implicated by said consent request, said filter is operative to selectively disable access to a first information item of said information items; and
providing an output based on said determination, said response including information of said first document with said first information item disabled.

8. The system of claim 7, wherein said multiple contextual fields include one or more fields relating to an intended purpose of said consent request.

9. The system of claim 7, wherein said processor is operative for determining to either allow or disallow access to said one or more items of user information.

10. The system of claim 9, wherein said one or more items of user information includes first and second items of user information and said processor is operative for allowing access to said first item of user information and disallowing access to said second item of user information.

11. The system of claim 7, wherein said purpose relates to a set of purposes defined by said controllers.

12. The system of claim 7, wherein said purpose is defined in relation to an input field of a user interface of a consent management program.

13. A method for use in controlling access to user information, comprising:
- receiving an access request concerning access to user information;
- processing the access request to determine a context of said access request, to identify multiple contextual fields of said access request, wherein said multiple contextual fields relate to an identity of a requester of said access request, an identity of a user and a purpose for which access is requested, and to obtain a content associated with each of said fields;
- identifying first and second items of user information implicated by said access request;
- obtaining context-based rules for each of one or more items of user information, wherein said context-based rules determine access to each of said items of said user information based on a context of the access request;
- using said content of said multiple contextual fields and said context-based rules to access said items of consent information and using a filter that allows access to a first item of said user information in a first document and disallows access to a second item of said user information in said first document.

14. The method of claim 13, wherein said multiple contextual fields include one or more fields relating to an intended purpose for accessing said one or more items of user information.

15. The method of claim 13, wherein said purpose relates to a set of purposes defined by a user.

* * * * *